ized Aug. 8, 1950

2,518,230

UNITED STATES PATENT OFFICE 2,518,230

AQUEOUS SOLUTIONS OF LIPOID-SOLUBLE VITAMINS

Louis Freedman, Mount Vernon, and Edward Green, New York, N. Y., assignors to U. S. Vitamin Corporation, a corporation of Delaware No Drawing. Application November 15, 1947, Serial No. 786,320

11 Claims. (Cl. 167—81)

This invention relates to a vitamin composition and particularly to one that may be stored in solid condition and dissolved in water previous to use.

The invention provides a composition in which vitamin A and other vitamins may be stored in solid form, with very little or no loss of activity for a period of a year or more and in which a clear solution of the composition in water may be made when desired, with a proportion of the stabilizing and solubilizing agent as low as two parts by weight for one part of the vitamin material.

The invention comprises a substantially fat-free, lipoid-soluble, normally water-insoluble material of high vitamin activity and a stabilizing and solubilizing agent therefor consisting of the addition product of ethylene oxide and a higher aliphatic alcohol which we name a hydroxy-polyoxyethylene ether.

An example of our improved composition is a solid consisting of 1 gram of a substantially fat-free concentrate rich in vitamin A and 2 grams of hydroxy-23-oxyethylene lauryl ether. The composition when allowed to stand at room temperature, without any special precaution to protect the vitamins against oxidation, lost only 8% in vitamin A activity in a storage period of more than one year.

In the improved composition of this invention, we have found that not all forms of the lipoid-soluble vitamins are adapted for use. Although the lipoid-soluble vitamins are naturally soluble in fats and fat solvents, we have found it necessary to remove the vitamins from the fatty media in which the vitamins normally occur.

As the vitamin component, we use such lipoid-soluble substances as high potency vitamin A substantially free of fat, either natural or synthetically prepared; high potency vitamin D, either natural or synthetically prepared but substantially free of fats; and high potency vitamen E also substantially free of fat, either the vitamin obtained from natural oils or the synthetically prepared active tocopherols such as alpha-tocopherol, the said vitamins being in the alcohol or ester forms.

As the stabilizing and solubilizing agent, we use a class of substances heretofore not used in connection with vitamins for dietary or therapeutic purposes, namely the hydroxy-polyoxyethylene ethers of aliphatic long chain alcohols. Such substances are the products formed by reacting long chain aliphatic alcohols with ethylene oxide under conditions causing addition and which have been described elsewhere.

The number of oxyethylene groups added must be sufficient to make the solubilizer itself soluble in water, and to remain completely soluble, with no visible clouding or dispersion, at normal room temperatures. This number varies from 10 to 200 depending on the length of the long chain aliphatic alcohol used but preferably is from 10 to 150 and for best practical results 18 to 150.

The long chain aliphatic alcohols used in making the ether may be saturated or unsaturated and contain 10 to 22 carbon atoms to the molecule but preferably 12 to 18 carbon atoms. Examples illustrating the class of alcohols are lauryl alcohol having 12 carbon atoms, cetyl alcohol having 16 carbon atoms, oleyl alcohol having 18 carbon atoms, and mixtures of higher alcohols including those prepared by hydrogenation of long chain fatty acids or oils. The mixture comprising principally lauryl alcohol prepared by the hydrogenation of coconut oil at high pressure is particularly satisfactory.

The ethers chosen for the present purpose are hydroxy-polyoxyethylene ethers of the aliphatic long chain alcohols that are solids at normal room temperature, melt in the range about 40° to 100° C. and preferably 40° to 65° C., and are soluble in water to the extent of at least 2½%. They are usually wax-like solids of white to yellow color. The long chain aliphatic alcohols represented in the ethers, as, for example those derived from long chain fatty acids, are themselves insoluble in water but have lipophilic properties for lipoid substances. These alcohols are reacted under known conditions with ethylene oxide, reaction being continued for our purpose until the ethylene oxide is added in number of molecules required to render the originally insoluble aliphatic alcohol soluble in water. For use in making vitamin solutions of relatively high potency, the ethylene oxide is introduced in amount to make the resulting ether soluble to the extent of at least 2½% and suitably to give a solid material of melting point within the range stated. The products of the reaction are both lipophilic and hydrophilic.

They are distinguished from the polyoxyalkylene derivatives of esters of polyhydric alcohols in that the ethers are less complex, more uniform in chemical structure, of lower molecular weights per unit of solubilizing potential, and more stable under conditions causing hydrolysis of esters.

Typical examples of these hydroxy-polyoxyethylene ethers that are satisfactory for our purpose are the following:

Hydroxy-10-oxyethylene lauryl ether
Hydroxy-15-oxyethylene lauryl ether
Hydroxy-23-oxyethylene lauryl ether
Hydroxy-45-oxyethylene lauryl ether
Hydroxy-105-oxyethylene lauryl ether
Hydroxy-150-oxyethylene lauryl ether
Hydroxy-20-oxyethylene cetyl ether
Hydroxy-20-oxyethylene stearyl ether In these names, the numbers 23, 45, etc. show the numbers of mols of ethylene oxide added for each mol of the alcohol used.

For the various lipoid-soluble substances, different proportions of the hydroxy-ethylene oxide ethers within the ranges given above are satisfactory. For a lipoid-soluble vitamin such as vitamin A acetate, for instance, less of the stabilizer and solubilizer are adequate than for the same weight of crystalline vitamin A. Likewise, a natural vitamin D concentrate, substantially free of fat, requires less of the solubilizer than does the same weight of synthetic vitamin D. In general, we have found that for one part of the lipoid-soluble vitamin approximately 2 to 20 parts and preferably 5 to 12 parts by weight of the ether of kind described are required. The hydrophilic properties of the mixtures, i. e., the miscibility of the solution in water, are a function of the proportions of the hydroxy-ethylene oxide ethers used. In preparing aqueous solutions of the lipoid soluble vitamins, in general, the proportions of said ethers and water should be such that, in the finished solution of all the components, there are approximately 2 to 10 parts and suitably 3 to 8 parts of the ether to 100 parts of the finished solution.

Proportions here and elsewhere herein are expressed as parts by weight unless otherwise specifically stated to the contrary.

In adapting the vitamin solutions previously described to dietary use, there may be added other substances if desired for their special effects. Such admixtures should be compatible with the mixture and soluble therein. Examples are conventional sweetening, coloring, flavoring, or viscosity-increasing agents. Glycerin or propylene glycol may be included to add body to the solution. Sucrose, glucose, and other sugars act as sweetening agents and also increase the viscosity of the solutions. Flavoring or certified coloring agents which are soluble in the mixtures may be utilized for purposes of palatability.

We have also discovered that the aqueous solutions containing the normally water-insoluble vitamins A and D and made as described herein are readily adaptable for the incorporation of one or more of the known water-soluble vitamins. These latter include vitamin $B_1$ or thiamine, vitamin $B_2$ or riboflavin, vitamin $B_6$ or pyridoxine, vitamin C or ascorbic acid, and nicotinic acid or its amide. Other water-soluble vitamins may be included as well as other fat-soluble vitamins such as vitamin E or alpha-tocopherol and vitamin K. While the water-soluble vitamins derived from natural sources may be used for the above-described purposes, it is preferable to use the easily obtainable synthetic vitamins which are now available in pure crystalline form.

Thus, solutions suitable for parenteral use for therapeutic purposes as well as for oral dietary use may be prepared incorporating the lipoid-soluble vitamins with one or more of the water-soluble vitamins.

The following general method is illustrative of a satisfactory procedure for preparing the vitamin solutions.

The solubilizing agent, a solid at room temperature, is weighed out into a small beaker in the amount required to render the vitamin soluble in water.

This amount is determined in advance by use of the ether in several proportions with the selected vitamin material, adding 10 drops of the resulting mix in molten condition from a standardized dropper to 25cc. distilled water at 25° C., with stirring at a constant speed. A specified volume of this solution is then transferred to a calibrated test tube and the degree of turbidity determined in a photoelectric turbidometer. The least amount of the stabilizer and solubilizer required to give zero turbidity was taken as the solubility potential of the ether for the respective vitamin.

This amount plus a moderate excess of the ether is melted by warming on a steam or hot water bath. The required amount of the respective vitamin is weighed out and then added to the molten solubilizer and the vitamin is thoroughly mixed in until dissolved to give a clear melt, that is clear to the unaided eye. In the case of vitamin A and other vitamins subject to oxidation, it is preferable, but not essential, to do the mixing under a head of nitrogen gas or other inert atmosphere to avoid undue oxidation by air and heat before the full protection by the ether is realized. The solution melts so prepared, on cooling to room temperature, solidify to give a homogeneous solid, which on remelting again gives clear solution melts. The solid solutions are particularly suitable for storing the vitamins for long periods of time, either at room temperature or under refrigeration, and can be used as required.

The vitamin mix is remelted and dissolved in water previous to use by adding the required amount of air-free distilled water to the melt and stirring until a clear, homogeneous solution is obtained. In another procedure, the vitamin material is mixed with the ether agent in solid form and the resulting mixture melted by moderate heat. The resulting product is a solution melt. An alternative procedure, particularly when working with large quantities of solutions, is to add the melt to the aqueous solution with proper mixing in a mixing vessel of suitable size and kind.

The invention will be further illustrated by the following specific examples:

*Example 1*

1.0 gram of a vitamin A and D concentrate substantially free of fat and assaying 1 million vitamin A units and 93,000 vitamin D units per gram was dissolved in 2.0 grams of hydroxy-23-oxyethylene lauryl ether as described in the general method above. A portion of the melt dissolved in water gave a clear solution which remained clear indefinitely.

The melt, on cooling, solidified to a hard, homogeneous solid having a vitamin A potency of 333,333 units per gram. The sample was allowed to stand at room temperature without any special precautions to protect the vitamin against oxidative decomposition for a long test period. Without remelting, an aliquot portion was assayed and found to contain 307,000 vitamin A units per gram, indicating a loss of less than 8%.

Example 2

0.29 gram of vitamin A concentrate, substantially fat-free, and having a vitamin A potency of 1.5 million units per gram was dissolved in 2.7 grams of hydroxy-23-oxyethylene lauryl ether as described above. A homogeneous melt was formed. The melt was added to 47.5 cc. of a standard aqueous base solution comprising water, glycerin and sugar and containing dissolved therein a mixture of water-soluble vitamins. The melt dissolved quickly to give a clear solution which has remained clear without visible dispersion or turbidity for more than one year. Such a solution contained, when prepared, about 9000 U. S. P. units of vitamin A per cubic centimeter. The same solution, after standing at room temperature for more than one year was again assayed and found to contain 8640 vitamin A units per cubic centimeter, showing a loss of vitamin A potency of 4%.

Example 3

0.28 gram of vitamin A concentrate having a potency of 1.7 million units per gram and being substantially fat-free was dissolved in 1.82 grams of hydroxy-20-oxyethylene cetyl ether as described above. A homogeneous melt resulted. The melt was added to the aqueous base solution as described in Example 2 to give a completely clear solution which remained clear indefinitely.

Example 4

0.5 gram of vitamin A and D concentrate, substantially fat-free and containing 1 million A units per gram, was dissolved in 2.5 grams of hydroxy-20-oxyethylene cetyl ether as described in the general method above. A clear homogeneous melt resulted. This melt, on cooling, solidified to a homogeneous solid having a vitamin A potency of 166,600 U. S. P. units per gram. After standing for more than one year at room temperature, the solidified material was again assayed without remelting. The vitamin A potency was found to be 133,000 U. S. P. units per gram, or 80% of the original vitamin A. Under the conditions described, a loss of 20% in more than one year is considered exceptionally low.

Example 5

0.28 gram of fat-free vitamin A concentrate having a potency of 1.7 million A units per gram was dissolved in 1.4 grams of hydroxy-45-oxyethylene lauryl ether as described above. The melt formed a clear, homogeneous solution which solidified to a hard, homogeneous solid on cooling. On remelting and adding to 47.5 cc. of the aqueous base solution as described in Example 3, the melt dissolved with stirring to give a clear solution containing 10,000 A units per cubic centimeter. When 0.6 cc. of this solution is added dropwise to water, milk or fruit juice, it gives a clear solution with no visible turbidity of emulsification. Such a solution is ideally suitable for dispensing to infants and children for dietary, prophylactic or therapeutic purposes in vitamin deficiencies.

Example 6

Example 5 was repeated, using 0.28 gram of vitamin A concentrate dissolved in 1.96 grams of hydroxy-105-oxyethylene lauryl ether. The same results with clear solutions throughout were obtained. These solutions remain clear indefinitely.

Example 7

Example 5 was repeated, using 0.28 gram of vitamin A concentrate dissolved in 2.8 grams of hydroxy-150-oxyethylene lauryl ether. The same results with clear solutions throughout were obtained, which solutions remain clear indefinitely.

Example 8

0.15 gram of crystalline vitamin A in the alcohol form, having a potency of about 450,000 units and being free of fat, was added to 1.5 grams of hydroxy-23-oxyethylene lauryl ether in a small beaker. The two substances were melted together under an atmosphere of inert gas to reduce oxidative decomposition of vitamin A, and stirred gently until the vitmain was in solution and a clear melt obtained. On cooling to room temperature, the melt solidified to form a homogeneous solid mass. The resulting composition may be dissolved in water as such without remelting or it may be remelted and then dissolved. In the latter case, the speed of solution is somewhat quicker. The composition dissolves readily in water Q. S. 9 cc. to give a clear solution having a vitamin A potency of 50,000 U. S. P. units per cubic centimeter. This solution remains clear indefinitely, and when added dropwise to milk gives a clear solution without dispersion or separation of the lipoid but now water-solubilized vitamin A.

Example 9

0.1 gram of irradiated ergosterol resin (synthetic vitamin $D_2$), having a vitamin D potency of 1.5 million units (15 million units per gram) was added with stirring to 1.2 grams hydroxy-45-oxyethylene lauryl ether previously melted in a beaker on a water bath. The vitamin D resin dissolved completely after several minutes to give a clear homogeneous melt. On cooling to room temperature, the melt solidified and appeared to be perfectly homogeneous. The melt dissolves quickly when added to distilled water Q. S. to make 15 cc. to give an aqueous solution containing 100,000 vitamin D units per cubic centimeter, 0.4 cc. of this solution containing 40,000 units of vitamin D can be added to 100 quarts of milk to give a stable vitamin D milk containing 400 U. S. P. units per quart.

Example 10

0.1 gram of crystalline vitamin $D_3$ (crystalline irradiated 7-dehydro-cholesterol) containing 40 million D units per gram was added to 1.2 grams of hydroxy-23-oxyethylene lauryl ether previously melted in a small beaker on a steam bath and gently stirred until the crystals dissolved to give a clear, uniform melt. On cooling, the melt solidified to a homogeneous solid. This composition may be dissolved in water as such or by previously remelting to give a clear aqueous solution in any potency desired. Thus, when made up to 10 cc., a potency of 400,000 D units per cubic centimeter is obtained. This composition may be utilized for fortifying milk, fruit juices, foods or other products with vitamin D as described in Example 9, or it may be utilized in combination with vitamin A, either synthetic or natural, for the preparation of multi-vitamin solutions in aqueous media as described in Example 2.

Example 11

0.138 gram of alpha-tocopherol oil, synthetically prepared alcohol form of vitamin E and being fat-free, was dissolved in 1.173 grams of hydroxy-20-oxyethylene cetyl ether previously melted in a small beaker on a steam bath by means of gently stirring. The alpha-tocopherol dissolved quickly to give a clear solution which, on cooling, solidified to a homogeneous solid. This composition may be dissolved in water to give a clear solution which remains clear indefinitely. Thus, dissolved in water Q. S. to make 6.9 cc. the above-described composition provides a clear, aqueous solution of vitamin E containing 20 milligrams per cubic centimeter. This solution or the composition of the melt may be utilized to fortify other aqueous solutions with added vitamin E in the manner previously described.

The composition of the vitamins and solubilizer in the form of a homogeneous solid may be advantageously adapted to incorporate the lipoid-soluble vitamins in solid preparations in powder or granular form such as are used for animal feeds or for fortifying solid or dry foods both for human and animal consumption. For example, a composition of vitamin A or vitamin D or mixtures of these two or more vitamins with one of the solubilizers described may be mixed or ground together with alfalfa meal or soybean meal or oat meal or any of the other well-known basic ingredients commonly used for feeds, to give a fortified composition in granular or solid form which may be dispensed as such or compressed into cakes. These preparations have a distinct advantage over preparations heretofore made with the oily vitamins, not only in physical composition but also in the stability of the vitamins. For instance, it is well known that vitamin D is relatively unstable in dry compositions, particularly in powdery or granular animal feed-stuffs.

Our compositions of matter as described above largely overcome this instability.

Example 12

More specifically a feed composition is made as follows.

A vitamin A mix is prepared by dissolving 4 parts by weight of a vitamin A concentrate substantially free of fat and containing 1.45 million units per gram in 18.4 parts of hydroxy-23-oxyethylene lauryl ether previously melted in a steam heated vessel, solution being facilitated by moderate stirring and being made under an atmosphere of nitrogen gas. The melt is allowed to cool until solidified. This composition contains about 260,000 vitamin A units per gram.

A basic cereal mix comprising 90% of soyabean meal (oil expressed), 5% alfalfa meal and 5% oat meal are combined in a suitable mixer with a previously prepared mineral mix comprising principally calcium phosphate, potassium phosphate, sodium chloride, and salts of elements used for dietary purposes in trace amounts, the whole being combined in a proportion of 90% of the basic cereal mix and 10% of the mineral mix.

A yeast liver vitamin mix containing all of the water soluble vitamins commonly used as dietary supplements is prepared by combining the said crystalline vitamins with a dry liver powder and irradiated yeast.

The final mix is prepared by blending or combining the above mixes in a suitable mixer in the following proportions:

| | Percent |
|---|---|
| Basic cereal mix | 98.4 |
| Yeast liver vitamin mix | 1.53 |
| Vitamin A mix | 0.07 |

In making our compositions, as, for instance, described above in Examples 1–12 inclusive, the compositions are adjusted to a level of pH as near as possible to the known optimum or optima for the vitamin or vitamins present. For thiamine, for instance, the pH is adjusted preferably to 4 or slightly lower. For a mixture of thiamine and other vitamins requiring a higher pH, the pH which we used is between that which is best for each of the separate vitamins. For a mixture of all of the vitamins including thiamine, we use a pH of about 4.5 to 5.5. For a composition comprising the lipoid soluble vitamins without thiamine, a pH of 6 to 7 is used. In general, the range for the compositions of the different vitamins with our stabilizing and solubilizing ethers is pH 3 to 9, the lower part of the range being used only when thiamine is present in the composition.

To establish the desired pH in the compositions made as described in the numbered examples, there is added in those examples an acidic or basic material that is conventionally used in establishing pH in vitamin compositions. Thus there may be used aqueous solutions of hydrochloric, phosphoric, citric or lactic acid if it is necessary to lower the acidity from that of the materials originally mixed, or aqueous solutions of sodium or potassium hydroxide or sodium carbonate in case it is necessary to increase the alkalinity to establish the desired level of pH in the finished product.

Solutions of the lipoid-soluble vitamins made as described above are useful in the fields of nutrition and medicine. For those vitamins which are known to be particularly susceptible to loss of activity when stored in solid condition in contact with air, our solid solutions provide for the first time a composition that may be kept, say in the form of a powder, for a long time without excessive loss of vitamin activity. The aqueous solutions are particularly useful in nutrition and therapy in cases in which rapid absorption of the vitamin is advantageous. They are useful also in cases in which normal absorption of the vitamin from the alimentary tract is impaired, a condition that frequently arises in infants and young children and also in the aged as a result of certain specific diseases or of abnormalities in the alimentary system.

When all of the advantages of the present composition, including the solid condition at summer temperatures, are not desired, there may be used as the stabilizing agent ethers of the kind described but containing a smaller number than stated above of the oxyethylene groups for one mol of the alcohol represented in the ether. Thus, the number of the oxyethylene groups may be as low as 6 or 7 to 10, provided the proportion of oxyethylene group is at least the minimum known to be required to make the ether soluble in water.

Various changes and modifications from those described in the above examples may be made in the compositions and methods of carrying out the invention. For example, mixtures of two or more of the solubilizers described may be used as solubilizing agents for the lipoid-soluble vitamins in a single composition.

Other desirable substances or ingredients may be added, provided such additions are mutually compatible with the basic ingredients as described in the examples.

The term "clear" as applied to our compositions refers to the appearance to the eye without microscopic or other aid.

In those uses of vitamins in which clearness of the solution in aqueous media is not of prime importance, the lipoid-soluble vitamins may be used in conjunction with some fat. An example is the use of our composition in vitamin tablets for oral use. Since the appearance of the aqueous solution which results in the alimentary system is not a factor, we use as the vitamin component in such tablets vitamin materials that are either fat-free or not entirely free of fat. In making such tablets for taking by way of the mouth, the procedures of Examples 1–11 may be modified, and in one embodiment of the invention, are modified by the inclusion of a small proportion of fat with the lipoid-soluble vitamins. We have found, however, that the vitamin compositions are particularly stable against loss of vitamin activity when fats are not present in any substantial amount.

It will be understood also that it is intended to cover all changes and modifications of the examples of the invention herein chosen for the purpose of illustration which do not constitute departures from the spirit and scope of the invention.

What we claim is:

1. A vitamin composition comprising a lipoid-soluble, normally water-insoluble, substantially fat-free material of high vitamin activity and a solubilizing agent dissolving the material and causing the material to be soluble in water, to give a stable clear solution without visible emulsification, the whole composition being substantially fat-free and the solubilizing agent being a water-soluble hydroxy-polyoxyethylene ether containing 10 to 150 oxyethylene groups to the molecule and being an ether of a long chain aliphatic alcohol containing 12 to 22 carbon atoms to the molecule.

2. A vitamin composition comprising vitamins A and D in substantially fat-free condition, a water-soluble hydroxy-polyoxyethylene ether of a long chain aliphatic alcohol containing 10 to 22 carbon atoms, and water, the said polyoxyethylene ether containing 10 to 150 oxyethylene groups to the molecule, having a melting point between 40° C. and 100° C. and causing the vitamins to dissolve in the water to give a stable, clear solution and the whole composition being substantially fat-free.

3. A composition of matter as described in claim 1, the stabilizing and solubilizing agent being a hydroxy-polyoxyethylene ether of lauryl alcohol containing 10 to 150 oxyethylene groups to the molecule.

4. A composition of matter as described in claim 1, the proportion of the stabilizing and solubilizing agent being approximately 2 to 20 parts for 1 part of the said lipoid-soluble material.

5. A composition of matter consisting of a stable, clear solution comprising a major proportion of water, a substantially fat-free lipoid-soluble material of high vitamin activity, and a water-soluble hydroxy-polyoxyethylene ether of a long chain aliphatic alcohol containing 12 to 22 carbon atoms to the molecule, the said ether containing 10 to 150 oxyethylene groups to the molecule, having a melting point above 40° C. and being present in the composition in the proportion of at least two parts by weight to one part of the vitamin and the whole composition being substantially fat-free.

6. A composition of matter as described in claim 1, the said lipoid-soluble material being vitamin A.

7. A composition of matter as described in claim 1, the said lipoid-soluble material being vitamin D.

8. A stable clear aqueous solution containing a substantially fat-free, lipoid-soluble material of high vitamin activity and as the solubilizer therefor a hydroxy-polyoxyethylene ether of lauryl alcohol, the said ether containing 18 to 23 oxyethylene groups to the molecule.

9. A stable clear aqueous solution containing a substantially fat-free, lipoid-soluble material of high vitamin activity and as the solubilizer therefor the hydroxy-polyoxyethylene ether of stearyl alcohol, the said ether containing about 23 oxyethylene groups to the molecule.

10. A stable clear aqueous solution containing a substantially fat-free, lipoid-soluble material of high vitamin activity and as the solubilizer therefor the hydroxy-polyoxyethylene ether of oleyl alcohol, the said ether containing about 23 oxyethylene groups to the molecule.

11. A composition of matter as described in claim 1, the said lipoid-soluble material being vitamin E.

LOUIS FREEDMAN.
EDWARD GREEN.

REFERENCES CITED

The following references are of record in the file of this patent:

UNITED STATES PATENTS

| Number | Name | Date |
| --- | --- | --- |
| 1,970,578 | Schoeller | Aug. 21, 1934 |
| 2,185,969 | Schultze | Jan. 2, 1940 |
| 2,417,299 | Freedman | Mar. 11, 1947 |

FOREIGN PATENTS

| Number | Country | Date |
| --- | --- | --- |
| 544,490 | Great Britain | Apr. 15, 1942 |